US012195219B2

United States Patent

Kim

(10) Patent No.: US 12,195,219 B2
(45) Date of Patent: Jan. 14, 2025

(12) United States Patent

(54) AUTOMATIC MEDICINE PACKING MACHINE

(71) Applicant: JVM CO., LTD, Daegu (KR)

(72) Inventor: Jun-ho Kim, Daegu (KR)

(73) Assignee: JVM CO., LTD, Daegu (KR)

( * ) Notice: Subject to any disclaimer, the term of this patent is extended or adjusted under 35 U.S.C. 154(b) by 0 days.

(21) Appl. No.: 17/141,370

(22) Filed: Jan. 5, 2021

(65) Prior Publication Data

US 2021/0292015 A1 Sep. 23, 2021

(30) Foreign Application Priority Data

Mar. 18, 2020 (KR) ........................ 10-2020-0033498

(51) Int. Cl.

| | |
|---|---|
| ***B65B 5/10*** | (2006.01) |
| ***B65B 1/04*** | (2006.01) |
| ***B65B 35/02*** | (2006.01) |
| ***B65B 43/46*** | (2006.01) |
| ***B65B 57/14*** | (2006.01) |
| ***G07F 17/00*** | (2006.01) |

(52) U.S. Cl.

CPC ................ *B65B 5/103* (2013.01); *B65B 1/04* (2013.01); *B65B 35/02* (2013.01); *B65B 43/46* (2013.01); *B65B 57/14* (2013.01); *G07F 17/0092* (2013.01)

(58) Field of Classification Search

CPC ..... B65B 5/103; B65B 65/003; B65B 65/006; G07F 17/0092

USPC .......................................... 53/154, 168, 202

See application file for complete search history.

(56) References Cited

U.S. PATENT DOCUMENTS

| | | | | | |
|---|---|---|---|---|---|
| 5,930,145 | A * | 7/1999 | Yuyama ............... | G06Q 10/087 | 235/375 |
| 6,006,946 | A * | 12/1999 | Williams ............ | G07F 17/0092 | 221/9 |
| 6,170,699 | B1 * | 1/2001 | Kim .................... | G07F 17/0092 | 221/253 |
| 7,182,105 | B1 * | 2/2007 | Feehan ................ | G07F 11/165 | 141/2 |
| 8,219,243 | B2 * | 7/2012 | Haas ................... | G07F 11/1657 | 700/214 |

(Continued)

FOREIGN PATENT DOCUMENTS

| | | | | |
|---|---|---|---|---|
| EP | 2797055 | A2 * | 10/2014 | ......... G07F 17/0092 |
| JP | 03111201 | A * | 5/1991 | |

*Primary Examiner* — Stephen F. Gerrity

(74) *Attorney, Agent, or Firm* — Dinsmore & Shobl LLP; Yongsok Choi, Esq.

(57) ABSTRACT

There is provided an automatic medicine packing machine for automatically packing medicines on a dose basis according to prescription information. The automatic medicine packing machine includes a medicine cassette mounting part in which a plurality of medicine cassettes for supplying the medicines are mounted; a medicine collecting part configured to collect the medicines supplied according to the prescription information; a medicine packing part configured to pack the medicines collected by the medicine collecting part on the dose basis; a medicine cassette storage part in which a plurality of medicine cassettes are placed and stored; and a medicine cassette replacement system configured to grip the medicine cassette and replace the medicine cassette between the medicine cassette mounting part and the medicine cassette storage part.

11 Claims, 11 Drawing Sheets

(56) References Cited

U.S. PATENT DOCUMENTS

| | | | | |
|---|---|---|---|---|
| 9,073,206 | B2 * | 7/2015 | Carson | B65B 5/103 |
| 2006/0072988 | A1 * | 4/2006 | Hariki | B25J 5/02<br>414/282 |
| 2008/0115456 | A1 * | 5/2008 | Kim | G07F 17/0092<br>53/154 |
| 2013/0062363 | A1 * | 3/2013 | Yuyama | B65B 35/08<br>221/82 |
| 2015/0190312 | A1 * | 7/2015 | Yuyama | B65B 35/08<br>700/232 |
| 2017/0015445 | A1 * | 1/2017 | Holmes | B65B 9/20 |
| 2017/0173796 | A1 * | 6/2017 | Kim | G05D 1/0246 |

* cited by examiner

PRIOR ART

AUTOMATIC MEDICINE PACKING MACHINE

CROSS-REFERENCE TO RELATED APPLICATION

This application claims priority to Korean Patent Application No. 10-2020-0033498 filed on Mar. 18, 2020, the entire contents of which are herein incorporated by reference.

TECHNICAL FIELD

The present disclosure relates to an automatic medicine packing machine for automatically discharging and packing medicines on a dose basis according to prescription information, and more particularly, to an automatic medicine packing machine configured to automatically replace a medicine cassette with a new one when the medicine cassette is empty or when the medicines accommodated in the medicine cassette are not sufficient, thereby packing the medicines in a faster manner and in larger quantities.

The present disclosure has been derived from a study conducted as Next-generation leading technology development business of Daegu Techno Park (Project Number: 7212101-2019-0002, Project Name: Development of robotic tablet packing system for improving pharmacy efficiency by 30% and automatically refilling medicines so as to meet Mail Order Pharmacy).

BACKGROUND ART

Referring to FIG. 1, there is exemplarily shown an automatic medicine packing machine 10 for automatically discharging and packing medicines on a dose basis according to prescription information. As shown in FIG. 1, the automatic medicine packing machine 10 is typically configured as including a main body 10, a plurality of medicine cassettes 20 disposed on the upper portion of the main body 10 and configured to accommodate a variety of sizes and forms of medicines (for example, medicines such as tablets, capsules or the like), a hopper 30 provided at the lower portion of the main body 10 and configured to collect medicines discharged and dropped from the medicine cassettes 20, a printing device 40 configured to print a variety of information on the surface of a medicine bag that packs the medicines, a packing device 50 configured to pack the medicines collected by the hopper 30 in the medicine bag, and the like.

As shown in FIG. 1, the automatic medicine packing machine 10 is configured to place the medicine cassettes 20 in a limited space provided in the upper portion of the main body 10 and receive the medicines through the medicine cassettes 20. As a result, there is a limit on the number of medicines that can be supplied to the automatic medicine packing machine 10 due to the constraint of a space in which the medicine cassettes 20 are accommodated, which may degrade the efficiency of the medicine packing operation.

In addition, in the conventional automatic medicine packing machine 10, when all of the medicines stored in the medicine cassette 20 are used, a pharmacist or manager stops the operation of the automatic medicine packing machine 10, takes out the medicine cassette 20 from the automatic medicine packing machine 10, and directly fills the medicine cassette 20 with the medicines. This makes the filling operation cumbersome, and the pharmacist or manager has a difficulty of taking the inventory of medicines to be filled into the medicine cassette one by one.

In addition, since the pharmacist or manager needs to mount the refilled cassette 20 correctly in its original position, the medicine refilling operation is very cumbersome. When the medicine cassette 20 is mounted in a position different from the original position, inappropriate medicines may be collected and packed, causing a medical accident.

SUMMARY

Technical Problem

The present disclosure is proposed to solve the aforementioned problems of the conventional automatic medicine packing machine, and is to provide an automatic medicine packing machine configured to, when a medicine cassette mounted in the automatic medicine packing machine is empty, automatically replace the empty medicine cassette with a new one and perform packing of medicines in a faster manner and in larger quantities.

Technical Solution

Representative configurations of the present disclosure for achieving the above-mentioned object are as follows.

According to one embodiment of the present disclosure, there is provided an automatic medicine packing machine for automatically packing medicines on a dose basis according to prescription information. The automatic medicine packing machine according to one embodiment of the present disclosure may comprise: a medicine cassette mounting part in which a plurality of medicine cassettes for supplying the medicines are mounted; a medicine collecting part configured to collect the medicines supplied according to the prescription information; a medicine packing part configured to pack the medicines collected by the medicine collecting part on the dose basis; a medicine cassette storage part in which a plurality of medicine cassettes are placed and stored; and a medicine cassette replacement system configured to grip the medicine cassette and replace the medicine cassette between the medicine cassette mounting part and the medicine cassette storage part.

According to one embodiment of the present disclosure, the medicine cassette replacement system may include a transfer robot equipped with a gripper for gripping the medicine cassette 110 at an end portion of the transfer robot.

According to one embodiment of the present disclosure, the transfer robot may be formed as a multi-joint robot.

According to one embodiment of the present disclosure, the medicine cassette replacement system may include a temporary stage provided at one side of the transfer robot and on which the medicine cassette is placed.

According to one embodiment of the present disclosure, the medicine cassette may be arranged in a same upward-downward orientation on the medicine cassette mounting part, the medicine cassette storage part and the temporary stage.

According to one embodiment of the present disclosure, the transfer robot may be configured to transfer the medicine cassette while keeping the upward-downward orientation of the medicine cassette constant.

According to one embodiment of the present disclosure, the medicine cassette may have a first grip groove formed to extend along a first direction and a second grip groove formed to extend along a second direction different from the first direction.

According to one embodiment of the present disclosure, the first grip groove may be formed to extend along a vertical direction of the medicine cassette, and the second grip groove may be formed to extend along a lateral direction of the medicine cassette.

According to one embodiment of the present disclosure, the medicine cassette transfer system may be configured such that the transfer robot is movable relative to the medicine cassette mounting part and the medicine cassette storage part along a guide rail.

According to one embodiment of the present disclosure, the medicine cassette may be provided with an identification information storage part that stores information on at least one of a type and quantity of the medicines stored in the medicine cassette, portion at which the medicine cassette is mounted in the medicine cassette mounting part, the medicine cassette storage part and the temporary stage may be provided with an identification information storage part that stores position information of the medicine cassette, and the medicine cassette, the medicine cassette mounting part, the medicine cassette storage part and the temporary stage may include an interface unit configured to transmit and receive the identification information stored in the identification information storage part.

According to one embodiment of the present disclosure, the medicine cassette storage part may be formed as storage shelves of a multi-layered structure in which a plurality of storage regions are formed, and a plurality of medicine cassettes may be able to be arranged in the plurality of storage regions in plural rows and plural columns.

According to one embodiment of the present disclosure, all or a portion of the medicine cassette storage part may be formed to have a configuration in which a plurality of storage shelves are arranged in the plural rows, and the plurality of storage shelves may be arranged in one direction in each of the plural rows.

According to one embodiment of the present disclosure, at least storage shelves other than rearmost storage shelve among the plurality of storage shelves arranged in the plural rows may be configured to move along a movement rail, and an empty space may be formed between adjacent storage shelves among the storage shelves other than the rearmost storage shelves.

According to one embodiment of the present disclosure, the medicine collecting part and the medicine packing part may include a plurality of medicine collecting parts and a plurality of medicine packing parts, respectively.

According to another embodiment of the present disclosure, there is provided a factory-type automatic medicine packing system including a plurality of the aforementioned automatic medicine packing machine. The automatic medicine packing system according to one embodiment of the present disclosure may comprise: a rail system provided at one side of the automatic medicine packing machine; a refill cassette stage mounted on the rail system and configured to be able to move along the rail system; a first refill cassette transfer device configured to transfer a medicine cassette between the automatic medicine packing machine and the refill cassette stage; a refill station configured to fill the medicine cassette with medicines; and a second refill cassette transfer device configured to transfer the medicine cassette between the refill cassette stage and the refill station.

In addition to the above, the automatic medicine packing machine according to the present disclosure may further include other additional components within the scope not impairing the technical idea of the present disclosure.

Advantageous Effects

The automatic medicine packing machine according to one embodiment of the present disclosure is configured to automatically replace an empty cassette mounted on the medicine cassette mounting part with a new one stored in the medicine cassette storage part using the transfer robot. Thus, it is possible to pack a larger number of medicines in a faster and easier manner.

Further, the automatic medicine packing machine according to one embodiment of the present disclosure is configured to include a temporary stage provided near the transfer robot and on which a medicine cassette can be placed. Thus, the automatic medicine packing machine can approach the medicine cassette to be replaced at a state that a new medicine cassette is placed on the temporary stage. Accordingly, a medicine cassette replacement operation can be easily and faster performed even if a single transfer robot is provided in the automatic medicine packing machine.

In addition, the automatic medicine packing machine according to one embodiment of the present disclosure is configured to be able to grip the medicine cassette in various directions with a plurality of grip grooves formed in the medicine cassette. Thus, it is possible to perform the medicine cassette replacement operation with a single transfer robot while keeping an upward-downward orientation of the medicine cassette constant. This makes it possible to automatically perform the medicine cassette replacement operation without damaging medicines.

DESCRIPTION OF DRAWINGS

FIG. 9A shows a state in which the medicine cassette mounted on the medicine cassette mounting part is gripped.

FIG. 9B shows a state in which the medicine cassette arranged in a medicine cassette storage part is gripped.

DETAILED DESCRIPTION

Figure 1:
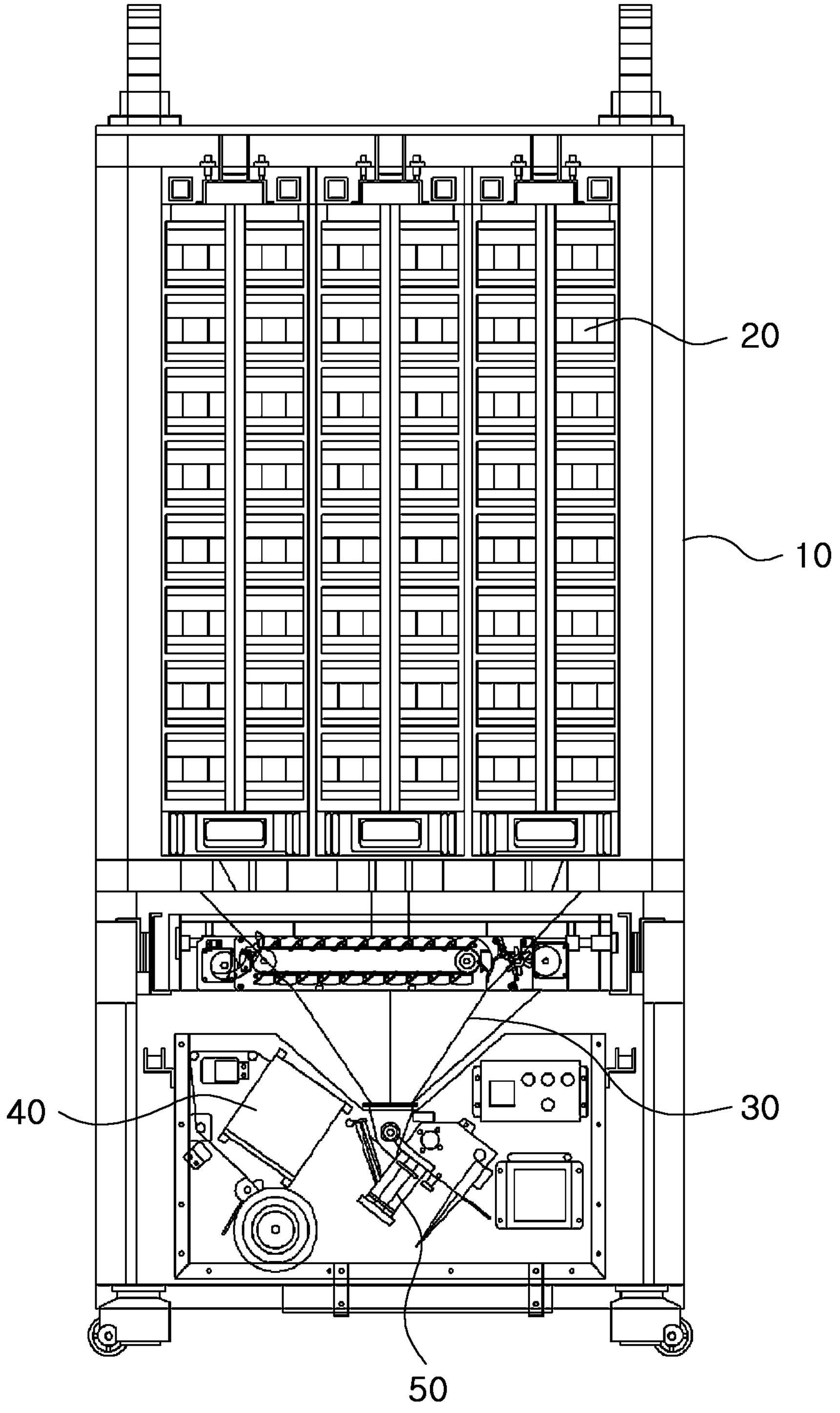
FIG. 1 exemplarily shows a schematic configuration of a conventional automatic medicine packing machine.

Hereinafter, preferred embodiments of the present disclosure will be described in detail with reference to the appended drawings to such an extent that the present disclosure can be readily implemented by one of ordinary skill in the art.

Detailed descriptions of parts irrelevant to the present disclosure will be omitted for the purpose of more clearly describing the present disclosure. Throughout the specification, the same components will be described using same reference numerals. In addition, the shapes and sizes of the respective components shown in the drawings are arbitrarily shown for the sake of convenience in description, and hence the present disclosure is not necessarily limited to the shapes and sizes shown. That is, it should be understood that specific shapes, configurations, and characteristics described in the specification may be modified in various embodiments without departing from the spirit and scope of the prevent disclosure, and positions or arrangements of individual components may be modified without departing from the spirit and scope of the prevent disclosure. Therefore, detailed descriptions to be described below should be construed as non-limitative senses, and the scope of the prevent disclosure should be understood to include appended claims and their equivalents.

Figure 2:
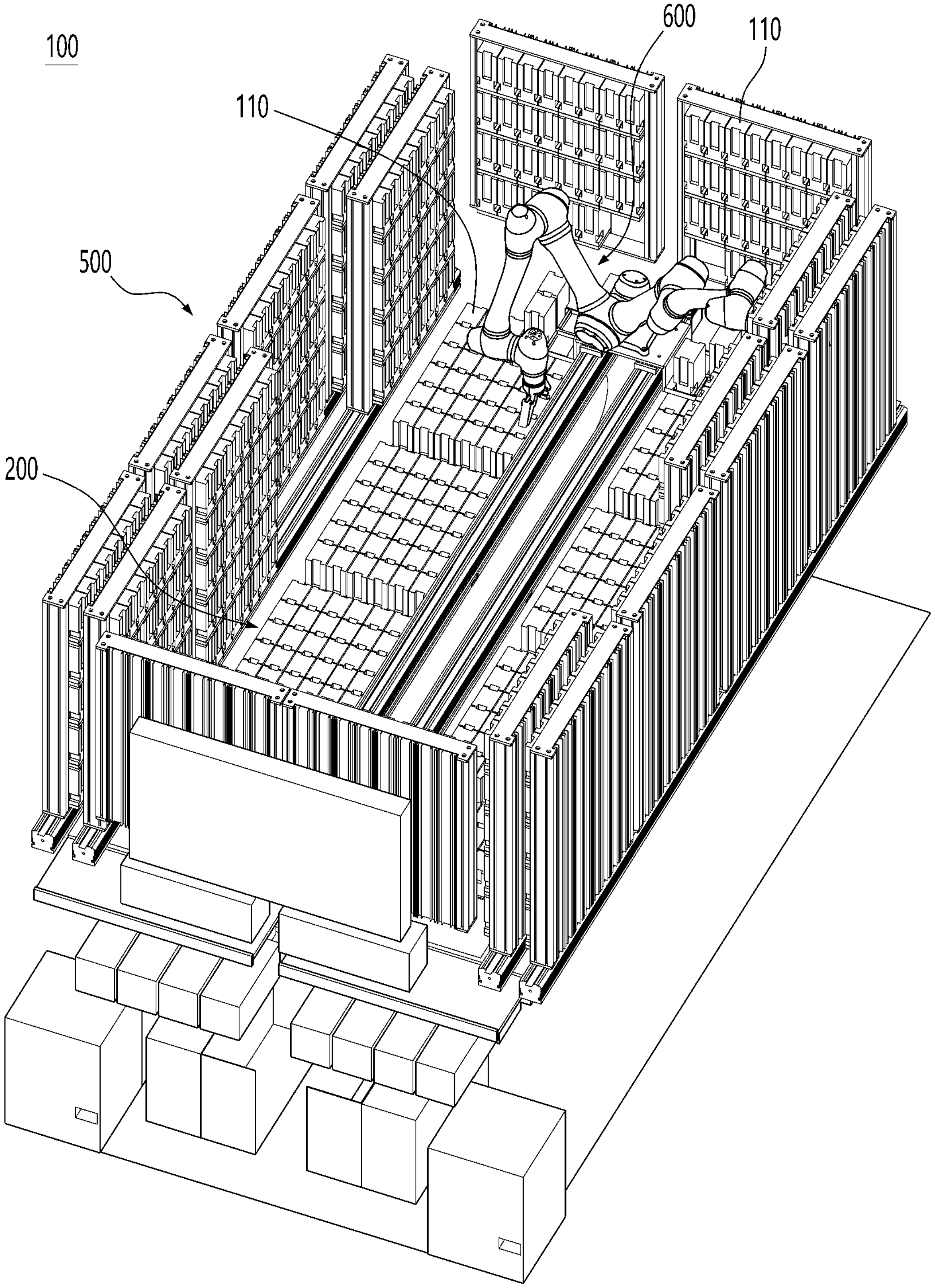
FIG. 2 exemplarily shows an overall configuration of an automatic medicine packing machine according to one embodiment of the present disclosure.
Figure 3:
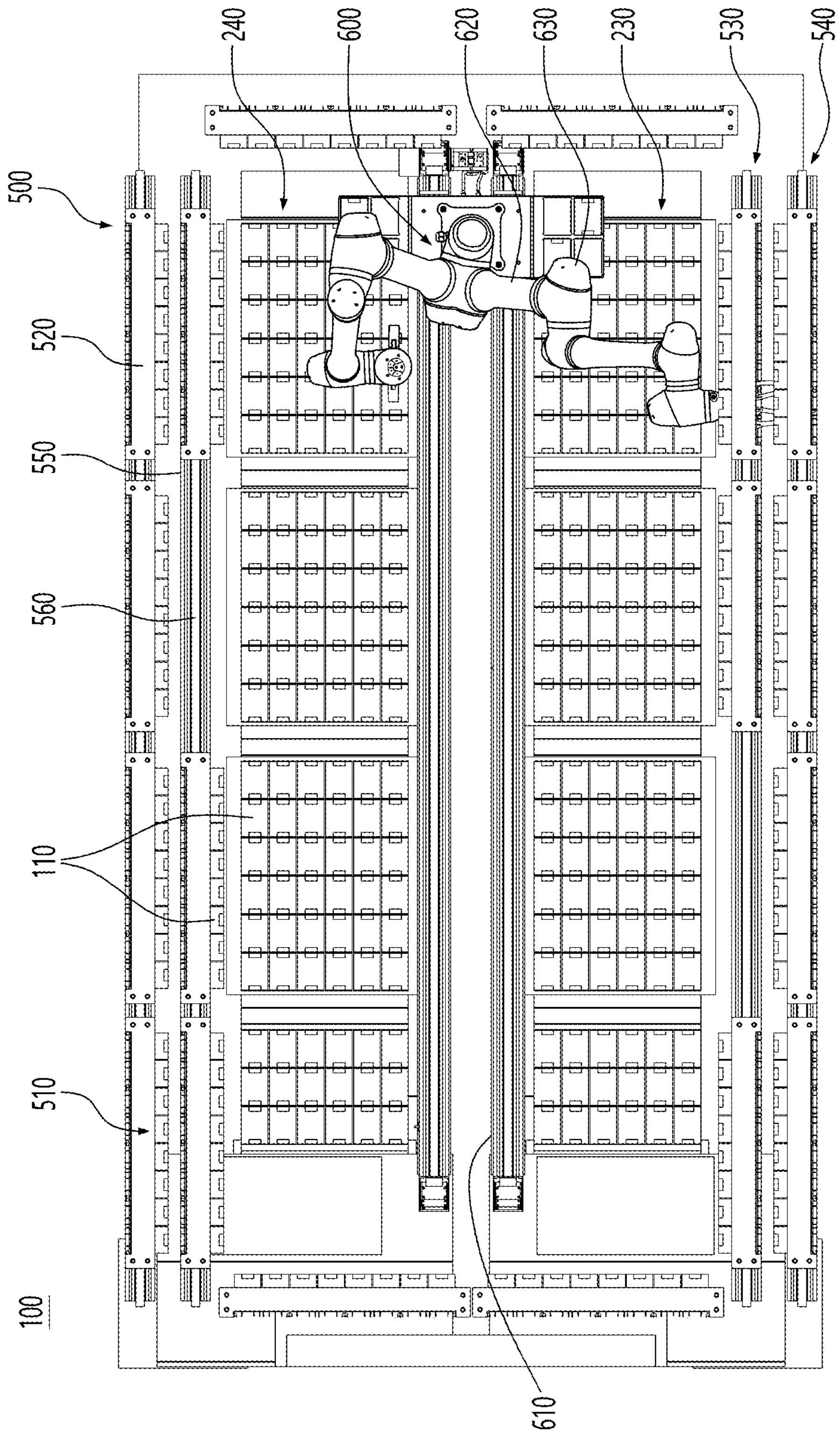
FIG. 3 exemplarily shows the automatic medicine packing machine of FIG. 2 as viewed from the front side.
Figure 4:
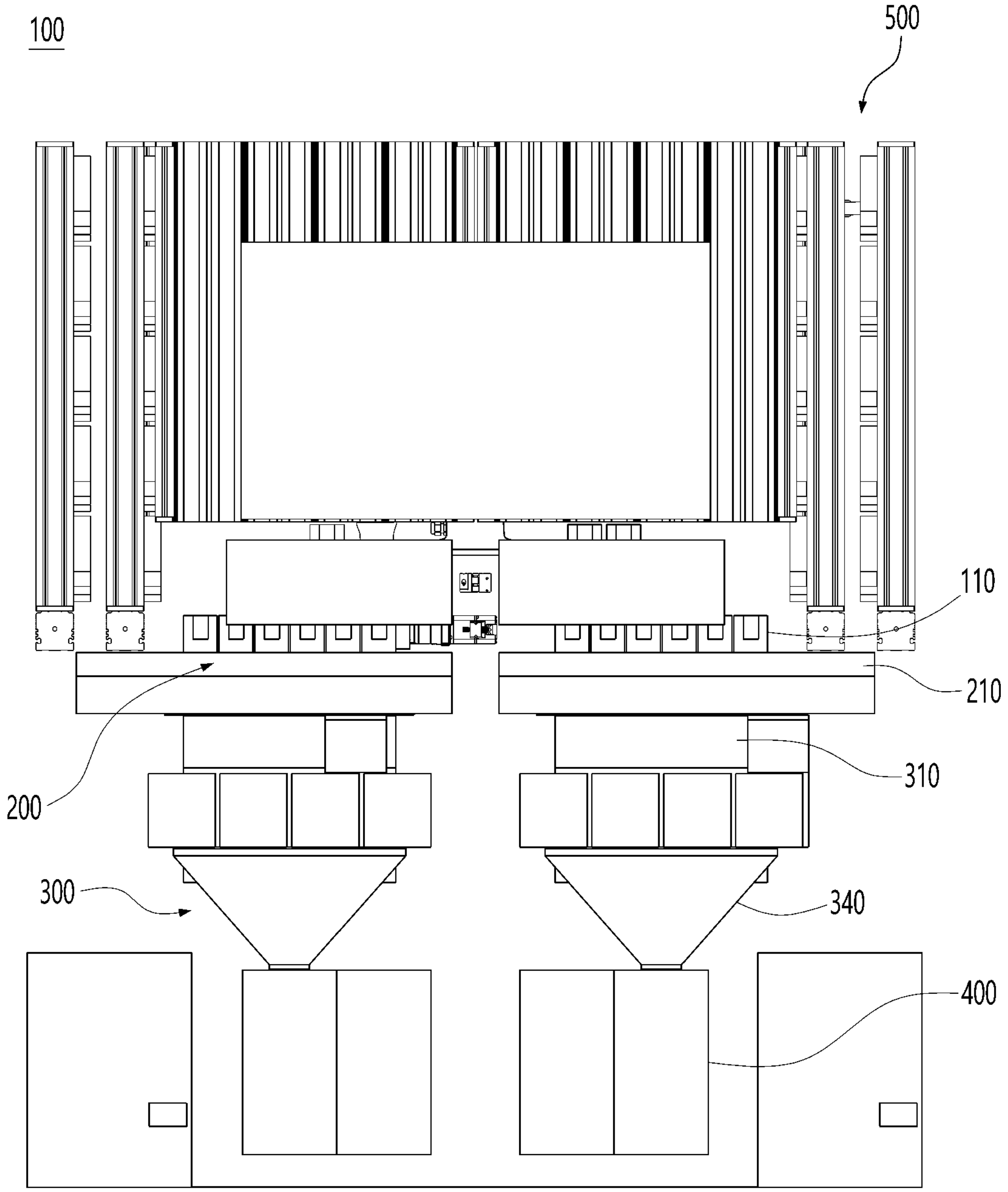
FIG. 4 exemplarily shows the automatic medicine packing machine of FIG. 2 as viewed from one lateral side.

First, referring to FIGS. 2 to 4, an overall configuration of an automatic medicine packing machine 100 according to one embodiment of the present disclosure is exemplarily shown (in FIGS. 2 to 4, an outer housing is omitted to more clearly show an internal configuration of the automatic medicine packing machine 100 according to one embodiment of the present disclosure).

The automatic medicine packing machine 100 according to one embodiment of the present disclosure may be configured to collect and pack medicines on a dose basis according to prescription information, like in a conventional automatic medicine packing machine. Further, the automatic medicine packing machine 100 is configured such that when all medicines accommodated in a medicine cassette have been used, the medicine cassette can be automatically replaced with a new medicine cassette to more rapidly perform the collection and packing of medicines in large quantities, as described below.

According to one embodiment of the present disclosure, the automatic medicine packing machine 100 may be configured to comprise a medicine cassette mounting part 200 on which a medicine cassettes 110 for supplying medicines are mounted; a medicine collecting part 300 configured to collect medicines according to prescription information and deliver the collected medicines to a medicine packing part; a medicine packing part 400 for packing and discharging the medicines collected by the medicine collecting part 300 on a dose basis; a medicine cassette storage part 500 in which a plurality of medicine cassettes are placed and stored; a medicine cassette replacement system 600 configured to replace the medicine cassette 110 with a new medicine cassette between the medicine cassette mounting part 200 and the medicine cassette storage part 500; and the like.

According to one embodiment of the present disclosure, the medicine cassette mounting part 200 may be configured such that the medicine cassette mounting part 200 is mounted on one side thereof, and may perform a function of delivering the medicines accommodated in the medicine cassette 110 to the medicine collecting part 300 according to the prescription information.

According to one embodiment of the present disclosure, the medicine cassette mounting part 200 may be formed in a plate structure in which the medicine cassette 110 is mounted on a top surface of the medicine cassette mounting part 200. A plurality of mounting holders 210 may be provided on the top surface of the plate structure that forms the medicine cassette mounting part 200 such that the medicine cassette 110 may be mounted on the top surface.

Figure 6:
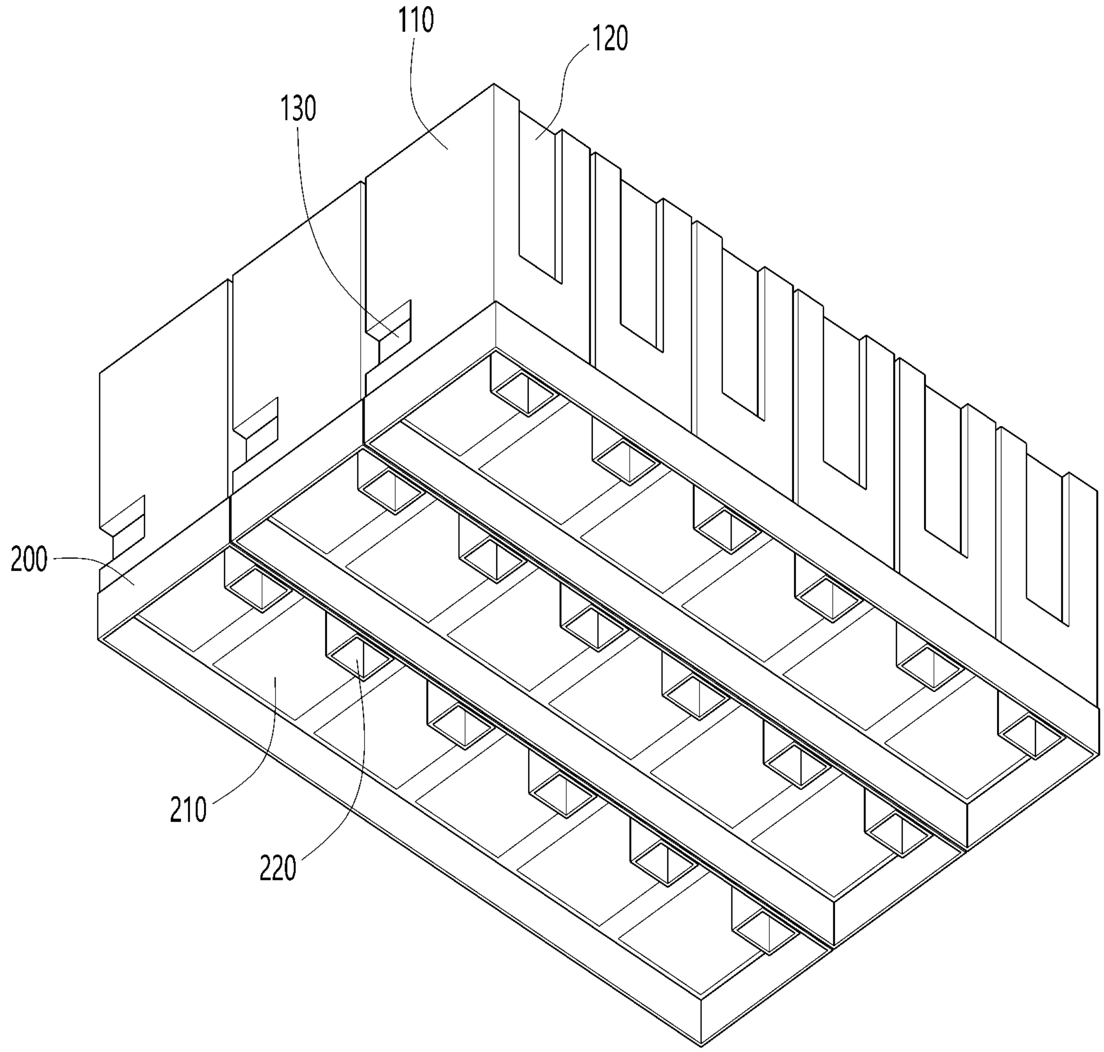
FIG. 6 exemplarily shows a lower structure of the medicine cassette mounting part according to one embodiment of the present disclosure.
Figure 7:
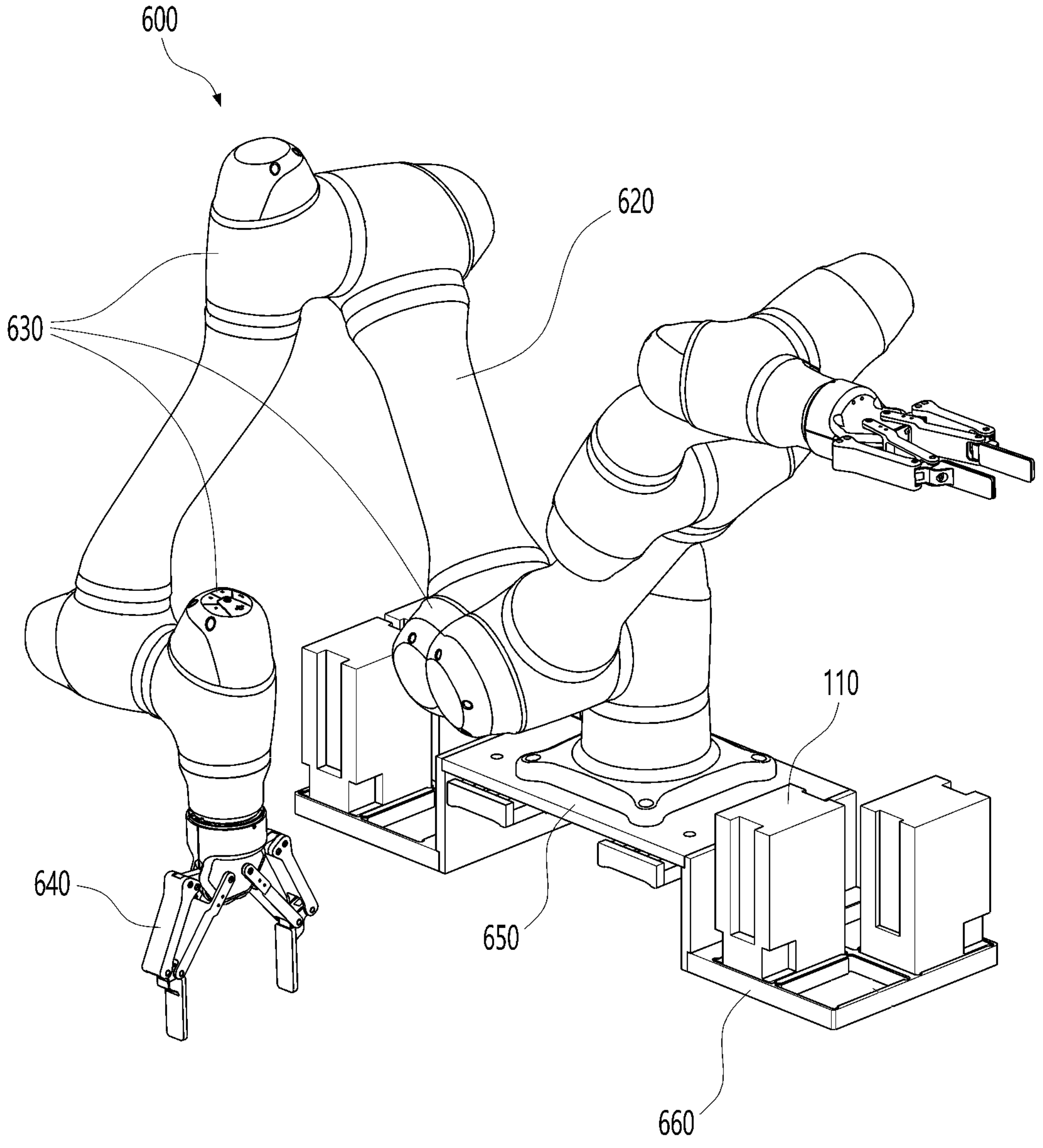
FIG. 7 exemplarily shows a medicine cassette replacement system, which can be used in the automatic medicine packing machine according to one embodiment of the present disclosure.

For example, the medicine cassette mounting part 200 may be configured such that the mounting holders 210 for mounting the medicine cassette 110 are arranged on the top surface of the plate structure in a matrix pattern. Further, the medicine cassette mounting part 200 may be configured such that a through-hole 220 is formed in a bottom surface of each mounting holder 210 and the medicines are discharged downward from the medicine cassette 110 disposed in each mounting holder 210 via the through-hole 220 (see FIG. 6). In particular, the through-hole 220 may be aligned with a through-hole (not shown) formed in a lower portion of the medicine cassette 110 mounted on the medicine cassette mounting part 200 so as to discharge the medicines accommodated in the medicine cassette 110 in a downward direction according to an operation of a shutter member, similar with a conventional medicine cassette.

According to one embodiment of the present disclosure, the medicine cassette mounting part 200 may be as a single plate structure, or may have a configuration in which a plurality of plate structures are combined.

For example, in the embodiment shown in the drawings, medicine cassette mounting parts (a first row of medicine cassette mounting part 230 and a second row of medicine cassette mounting part 240) may be arranged in two rows at both sides of a guide rail 610 of the medicine cassette replacement system 600 (to be described later). The medicine cassette mounting part of each row may be configured to have a plurality of plate structures (three plate structures are provided in each raw of the embodiment shown in FIGS. 2 to 4).

According to one embodiment of the present disclosure, the medicine collecting part 300 may be disposed below the medicine cassette mounting part 200, and may include a medicine collecting tray 310 of receiving the medicines discharged from the medicine cassette 110.

According to one embodiment of the present disclosure, the medicine collecting tray 310 may be configured to receive and transfer the medicines discharged from the medicine cassette 110 mounted on the medicine cassette mounting part 200 while moving relative to the medicine cassette mounting part 200 below the medicine cassette mounting part 200 through a conveyor belt 320 rotated by an electric motor (not shown).

According to one embodiment of the present disclosure, the medicine collecting tray 310 may be configured to include a plurality of medicine reception pockets 330 arranged along a longitudinal direction of the conveyor belt 320 and to receive the medicines dropped from the medicine cassette 110 in the medicine reception pockets 330. To do this, each of the medicine reception pocket 330 may have one opened surface (for example, opened upper surface).

According to one embodiment of the present disclosure, in the case in which a plurality of medicine cassettes 110 are arranged on the medicine cassette mounting part 200 in a widthwise direction of the conveyor belt 320 as in the embodiment shown in the drawings, the medicine reception pockets 330 may be formed in a structure having a long length in the widthwise direction of the conveyor belt 320 to receive all medicines dropped from the plurality of medicine cassettes 110.

Figure 5:
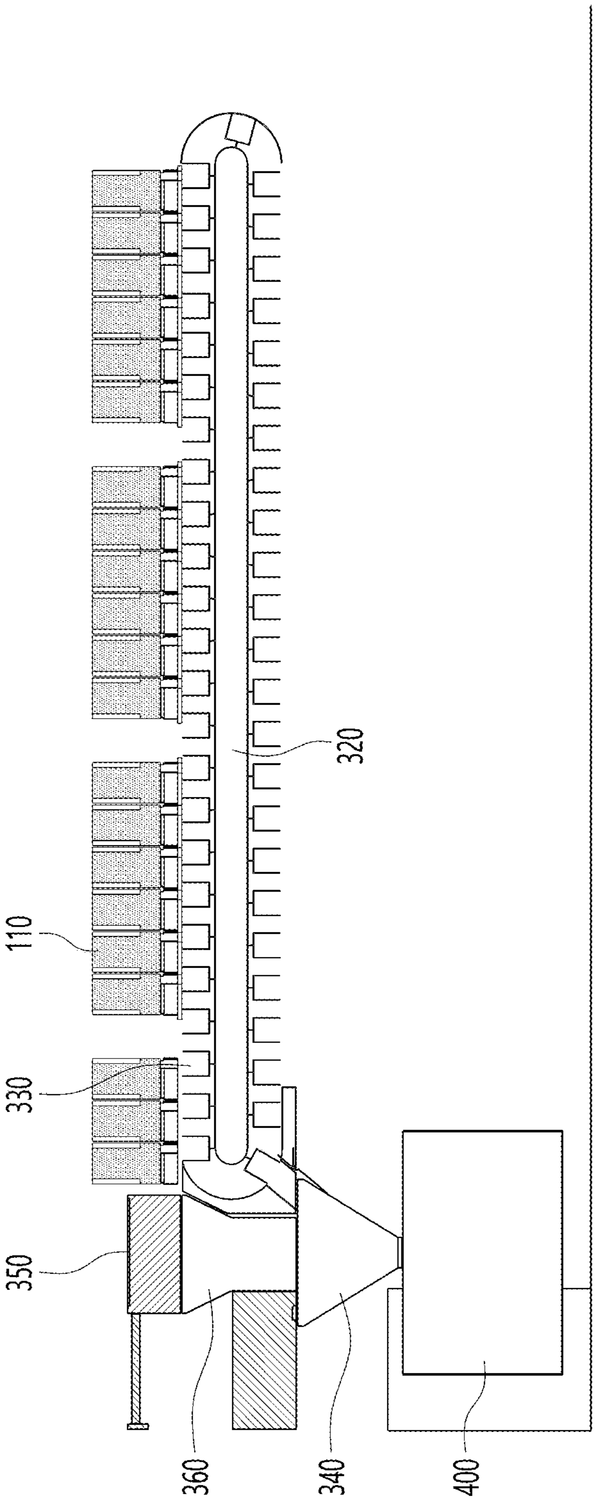
FIG. 5 exemplarily shows cross-sectional configurations of a medicine cassette mounting part, a medicine collecting part and a medicine packing part included in the automatic medicine packing machine according to one embodiment of the present disclosure.

According to one embodiment of the present disclosure, a medicine collecting hopper 340 may be disposed on one side of the medicine collecting tray 310. As shown in FIG. 5, the medicine collecting hopper 340 may be disposed below the medicine collecting tray 310 at one end portion of the medicine collecting tray 310 so as to collect the medicines collected and moved by the medicine reception pocket 330 of the medicine collecting tray 310.

According to one embodiment of the present disclosure, the medicine collecting part 300 may be configured to further include a powdery-medicine supply part 350 for supplying medicines (for example, powdery medicine) other than the form of a tablet, capsule or the like, and the like. For example, the powdery-medicine supply part 350 may be formed in the form of a tray having partitions, similar with the conventional automatic medicine packing machine, and may be configured to supply the powdery medicine to the medicine collecting hopper 340 through a powdery-medicine transfer part 360.

According to one embodiment of the present disclosure, the medicine packing part 400 may perform a function of receiving the medicines from the medicine collecting hopper 340 to automatically pack and discharge the medicines on a dose basis according to the prescription information. According to one embodiment of the present disclosure, the medicine packing part 400 may be configured identically or similarly to a medicine packing part of the conventional automatic medicine packing machine. The medicine packing part 400 may be provided with a printing part configured to print information about a patient and/or medicines on the surface of a medicine packet.

According to one embodiment of the present disclosure, a plurality of medicine collecting parts 300 and/or a plurality of medicine packing parts 400 may be provided in the automatic medicine packing machine 100. For example, in the embodiment shown in the drawings, the medicine cassette mounting parts 200 are configured to be arranged at both sides of the guide rail 610 of the medicine cassette replacement system 600. The medicine collecting parts 300 and the medicine packing parts 400 are configured to be arranged according to each of the medicine cassette mounting parts 200. Thus, it is possible to more quickly collect and pack the medicines with the plurality of medicine collecting parts 300 and the plurality of medicine packing parts 400.

Further, according to one embodiment of the present disclosure, an inspection system 450 may be further provided on one side of the medicine collecting part 300 and/or the medicine packing part 400 to check whether or not medicines are accurately collected/packed on a dose basis according to the prescription information by capturing an image of the collected or packed medicines.

According to one embodiment of the present disclosure, the inspection system 450 may be configured with a vision system or the like configured to capture an image of the collected or packed medicines using a camera, and may be configured identically or similarly to a medicine inspection system used in the conventional automatic medicine packing machine.

According to one embodiment of the present disclosure, the medicine cassette storage part 500 in which a plurality of medicine cassettes 110 are arranged and stored, may be provided at one side of the medicine cassette mounting part 200 on which a plurality of medicine cassettes 110 are mounted.

According to one embodiment of the present disclosure, the medicine cassette storage part 500 may be provided above the medicine cassette mounting part 200, and may be formed in a shelf-like structure having a plurality of storage regions 510 in which the medicine cassettes 110 are disposed and stored.

For example, according to one embodiment of the present disclosure, the medicine cassette storage part 500 may be configured such that a plurality of medicine cassettes 110 are disposed and stored in the medicine cassette storage regions 510 which are tightly formed in plural rows and plural columns, as shown in the drawings.

In the embodiment shown in the drawings, the medicine cassette storage part 500 is provided on side surface portions of the main body of the automatic medicine packing machine 100 above the cassette mounting part 200. However, the medicine cassette storage part 500 is not limited to the above-described configuration, and the medicine cassette storage part 500 may be provided only on a portion of the side surface portion or may be further provided on a wall surface or the like.

According to an embodiment of the present disclosure, the medicine cassette storage part 500 may be provided to have a configuration in which storage shelves 520 on which a plurality of storage regions 510 are formed in plural rows and plural columns are arranged in plural rows so as to be able to store a larger number of medicine cassettes 110.

Referring to FIGS. 2 to 4, there is exemplarily shown the embodiment in which the medicine cassette storage parts 500 arranged at both sides of the main body of the automatic medicine packing machine 100 are formed in a shelf-like structure of double rows. For example, the medicine cassette storage part 500 may be configured to include a first row of medicine cassette storage part 530 having one or more storage shelves 520 arranged in one direction, and a second row of medicine cassette storage part 540 disposed at the rear side of the first row of medicine cassette storage part 530 and having one or more storage shelves 520 arranged in one direction.

According to one embodiment of the present disclosure, when the medicine cassette storage part 500 is formed in a plural-row structure as described above, at least storage shelves other than the rearmost storage shelves may be configured to be movable along a movement rail 550, and at least storage shelves other than the rearmost storage shelves may be configured to have an empty space 560 formed between the storage shelves.

For example, the medicine cassette storage part 500 may be provided to have a configuration in which a plurality of storage shelves are arranged in one direction, as the medicine cassette storage parts shown in both sides in FIGS. 2 to 4. In this embodiment, the number of storage shelves disposed at the front side is smaller than that of the storage shelves disposed at the rear side by at least one or more to form the empty space 560 between the front-side storage shelves. Through the empty space 560, a transfer robot 620 (to be described later) of the medicine cassette replacement system 600 can easily approach and grip the medicine cassette of the rear-side storage shelf.

According to one embodiment of the present disclosure, the medicine cassette replacement system 600 is provided between the medicine cassette mounting part 200 and the medicine cassette storage part 500 to automatically replace the medicine cassette 110 between the medicine cassette mounting part 200 and the medicine cassette storage part 500.

According to one embodiment of the present disclosure, the medicine cassette replacement system 600 may perform a function of gripping and moving the medicine cassette 110 between the medicine cassette mounting part 200 and the medicine cassette storage part 500.

According to one embodiment of the present disclosure, the medicine cassette replacement system 600 may be configured to be able to approach and grip a plurality of medicine cassettes 110, which are disposed in the medicine cassette mounting part 200 and the medicine cassette storage part 500, using the transfer robot 620.

According to one embodiment of the present disclosure, the transfer robot 620 of the medicine cassette replacement system 600 may be formed as a multi-joint robot so as to access various positions. For example, the transfer robot 620 may be configured to have one or more joints 630 to access various positions and in various directions. Further, the transfer robot 620 may have a gripper 640 provided at the end thereof to grip the medicine cassette 110.

According to one embodiment of the present disclosure, the transfer robot 620 of the medicine cassette replacement system 600 may be configured to be movable within the automatic medicine packing machine 100 via the guide rail 610 so that the transfer robot 620 can access various positions. For example, as shown in FIGS. 2 to 6, the medicine cassette replacement system 600 is configured such that the transfer robot 620 is mounted on a mounting base 650 which is provided on the guide rail 610 disposed on one side of the medicine cassette mounting part 200. Thus, by changing a position of the transfer robot 620 through the guide rail 610, it is possible for the transfer robot 620 to access various positions in the medicine cassette mounting part 200 and the medicine cassette storage part 500.

According to one embodiment of the present disclosure, the medicine cassette replacement system 600 may include a temporary stage 660 configured to temporarily locate the medicine cassette 110 in the vicinity of the transfer robot 620.

As described above, by providing the temporary stage 660 on one side of the transfer robot 620 constituting the medicine cassette replacement system 600 and moving the transfer robot 620 to the vicinity of the medicine cassette 110 to be replaced on the medicine cassette mounting part 200 in a state in which a new medicine cassette 110 is placed on the temporary stage 660, it is possible to perform a medicine cassette replacement operation of replacing the medicine cassette 110 to be replaced disposed on the medicine cassette mounting part 200 with the new medicine cassette 110 on the temporary stage 660. This makes it possible to replace the medicine cassette with a new one using only one transfer robot having a multi-joint, and perform the medicine cassette replacement in a faster and easier manner. Although, in the embodiment shown in the drawings, the medicine cassette mounting parts 200 are provided in two rows, the medicine collecting part 300 and the medicine packing part 400 are provided in two rows below the medicine cassette mounting parts 200, and the transfer robots 620 are provided at both sides of the medicine cassette mounting parts 200 for the purpose of a faster packing operation, the automatic medicine packing machine 100 configured as above according to an embodiment of the present disclosure may perform the medicine cassette replacement operation using the single transfer robot 620.

According to one embodiment of the present disclosure, the medicine cassette 110 may be arranged in a same upward-downward orientation on the medicine cassette mounting part 200, the medicine cassette storage part 500, and the temporary stage 660 of the medicine cassette replacement system 600, and the transfer robot 620 of the medicine cassette replacement system 600 may be configured to transfer the medicine cassette 110 without changing the upward-downward orientation of the medicine cassette 110.

When the medicine cassette 110 gripped by the transfer robot 620 is moved while being obliquely oriented or greatly swing, there is a concern that medicines such as tablets, or the like stored in the medicine cassette 110 may be damaged. However, in the automatic medicine packing machine 100 according to one embodiment of the present disclosure, the medicine cassette 110 gripped by the transfer robot 620 is configured to be moved while maintaining the upward-downward orientation. This prevents the medicine cassette 110 gripped and moved by the transfer robot 620 from drastically shaking, thus suppressing damage of the medicines such as tablets stored in the medicine cassette 110.

To do this, the medicine cassette 110 used in the automatic medicine packing machine 100 according to one embodiment of the present disclosure may be configured to have one or more grip grooves into which the grippers 640 of the transfer robot 620 are inserted and coupled.

Figure 8:
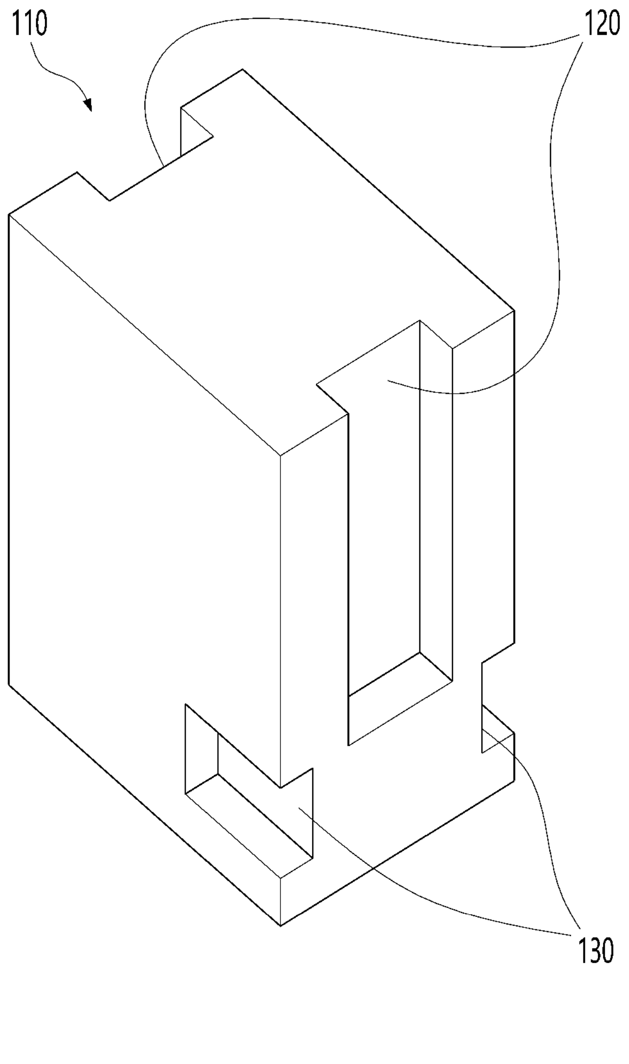
FIG. 8 exemplarily shows a configuration of a medicine cassette, which can be used in the automatic medicine packing machine according to one embodiment of the present disclosure.

For example, as shown in FIG. 8, the medicine cassette 110, which may be used in the automatic medicine packing machine 100 according to one embodiment of the present disclosure, may be configured to have a first grip groove 120 formed to extend in a first direction (for example, a vertical direction) and a second grip groove 130 formed to extend in a second direction (for example, a lateral direction) different from the first direction.

Figure 9A:
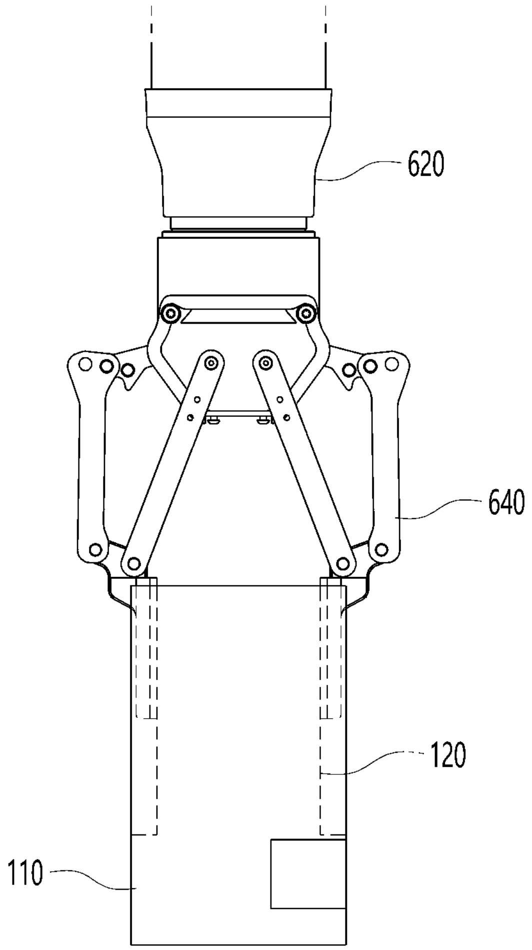
FIG. 9A exemplarily shows a state in which the medicine cassette is gripped by the medicine cassette replacement system in the automatic medicine packing machine according to one embodiment of the present disclosure. Specifically.
Figure 9B:
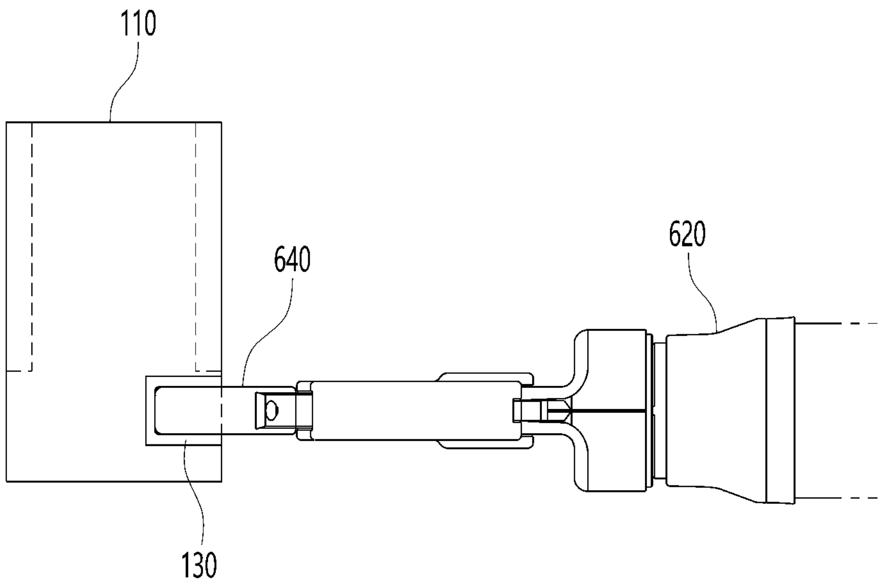
FIG. 9B exemplarily shows a state in which the medicine cassette is gripped by the medicine cassette replacement system in the automatic medicine packing machine according to one embodiment of the present disclosure. Specifically.

With this configuration, when the transfer robot 620 of the medicine cassette replacement system 600 grips and moves the medicine cassette 110 mounted on the medicine cassette mounting part 200, the grippers 640 of the transfer robot 620 may be inserted into the first grip grooves 120 of the medicine cassette 110 in the vertical direction (i.e., a direction that the first grip grooves 120 is formed) to grip the medicine cassette 110, as shown in FIG. 9A. Further, when the transfer robot 620 grips and moves the medicine cassette 110 disposed in the medicine cassette storage part 500, the grippers 640 of the transfer robot 620 may be inserted into the second grip grooves 120 of the medicine cassette 110 in the lateral direction (i.e., a direction in which each of the second grip grooves 120 is formed) to grip the medicine cassette 110, as shown in FIG. 9B.

More specifically, the medicine cassette replacement system 600 of the automatic medicine packing machine 100 according to one embodiment of the present disclosure may be configured such that, in the case of moving the medicine cassette 110 between the medicine cassette mounting part 200 and the temporary stage 660, the grippers 640 of the transfer robot 620 are inserted into the first grip grooves 120 of the medicine cassette 110 to move the medicine cassette 110 while gripping the medicine cassette 110 from the top, and in the case of moving the medicine cassette 110 between the medicine cassette storage part 500 and the temporary stage 660, the grippers 640 of the transfer robot 620 are inserted into the second grip grooves 130 of the medicine cassette 110 to move the medicine cassette 110 while gripping the medicine cassette 110 from the lateral side.

Although not shown in the drawings for the sake of convenience in illustration, the medicine cassette 110 may have a lid provided on one side thereof. When the lid is opened, medicines can be supplied to the medicine cassette 110 through the opened lid portion.

According to one embodiment of the present disclosure, an interface unit configured to recognize a type, quantity and the like of medicines stored in the medicine cassette 110, information on a position at which the medicine cassette is mounted, and the like, may be provided in the medicine cassette 110, the medicine cassette mounting part 200, the medicine cassette storage part 500, the temporary stage 660 of the medicine cassette replacement system 600, and the like.

For example, the medicine cassette 110 may include an identification information storage part that stores information on a type, quantity and the like of medicines stored in the medicine cassette 110. The medicine cassette mounting part 200, the medicine cassette storage part 500, the temporary stage 660, and the like may include an identification information storage part that stores position information on a position. The identification information may be transmitted and received through the interface unit so that the information on the type, quantity and the like of medicines stored in the medicine cassette 110, and the position information of the medicine cassette mounting part 200, the medicine cassette storage part 500, and the temporary stage 660 on which the medicine cassette 110 is mounted may be transmitted and received with respect to each another.

With such a configuration, the automatic medicine packing machine 100 according to one embodiment of the present disclosure is capable of identifying the position where the medicine cassette 110 accommodating particular medicines is disposed on the medicine cassette mounting part 200, the medicine cassette storage part 500 or the temporary stage 660. Thus, the automatic medicine packing machine 100 can be automatically operated while automatically replacing the medicine cassette 110 according to an operational instruction provided from a controller (not shown).

According to one embodiment of the present disclosure, the interface unit provided in the medicine cassette 110, the medicine cassette mounting part 200, the medicine cassette storage part 500, the temporary stage 660, and the like may be implemented through a typical communication method such as Near Field Communication (NFC), Radio Frequency Identification (RFID), an electrical connector, or the like.

Further, according to one embodiment of the present disclosure, the automatic medicine packing machine 100 may be configured such that a medicine cassette which are frequently used and needs to be frequently replaced, or a medicine cassette to be placed soon among the medicine cassettes mounted on the medicine cassette mounting part 200 may be controlled to be placed in advance on the temporary stage 660 of the medicine cassette replacement system 600, thus performing replacement of the medicine cassette in a faster manner and further enhancing the efficiency of the automatic medicine packing machine 100.

Figure 10:
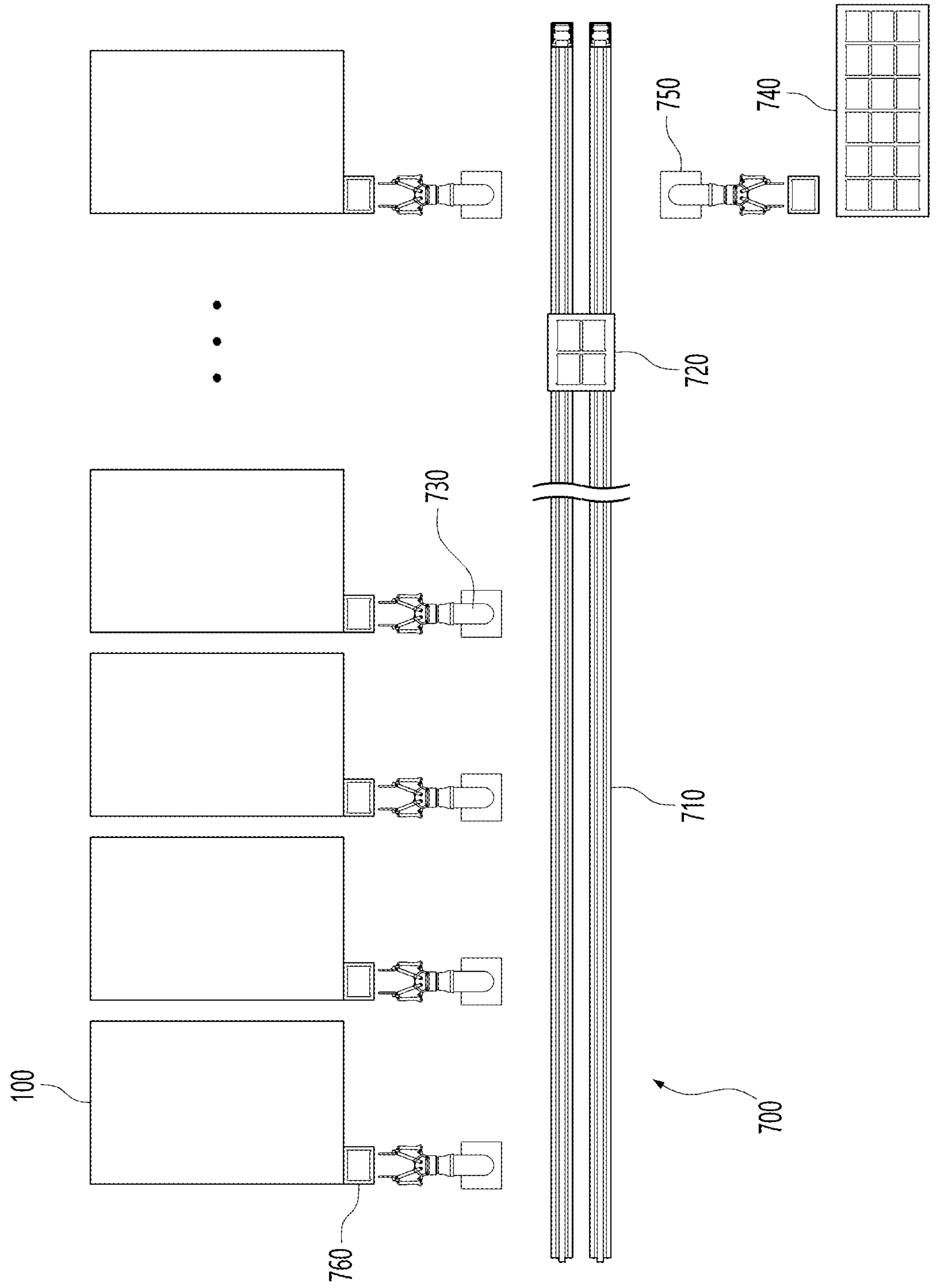
FIG. 10 conceptually shows a configuration in which a factory-type medicine packing system is implemented using the automatic medicine packing machine according to one embodiment of the present disclosure.

According to one embodiment of the present disclosure, a plurality of automatic medicine packing machines 100 may be provided in a factory-type configuration to perform the automatic medicine packing operation more efficiently, as shown in FIG. 10.

In such a case, the automatic medicine packing machines 100 according to one embodiment of the present disclosure may be configured to be operated while automatically replacing an empty medicine cassette 110 in the medicine cassette storage part 500 with a medicine-filled cassette 110 by a medicine cassette refill system 700.

According to one embodiment of the present disclosure, the medicine cassette refill system 700 may be configured to include a rail system 710 provided at one side of the automatic medicine packing machine 100, a refill cassette stage 720 mounted on the rail system 710 and configured to be movable along the rail system 710, a refill cassette transfer device (a first refill cassette transfer device 730) located between the rail system 710 and the automatic medicine packing machine 100 to transfer the medicine cassette 110 between the automatic medicine packing machine 100 and the refill cassette stage 720, a refill station 740 provided at one side of the rail system 710 to refill medicines to an empty cassette, another refill cassette transfer device (a second refill cassette transfer device 750) configured to transfer the medicine cassette 110 between the refill cassette stage 720 and the refill station 740, and the like.

The medicine cassette refill system 700 configured as above may be operated in the following manner.

First, an empty medicine cassette 110 stored in the medicine cassette storage part 500 of the automatic medicine packing machine 100 may be delivered to the refill cassette stage 720 on the rail system 710 through the first refill cassette transfer device 730. To this end, the automatic medicine packing machine 100 may include a buffer station 760 provided at one side thereof to move the empty medicine cassette 110 to be refilled onto the buffer station 760. The first refill cassette transfer device 730 may be configured to grip and deliver the medicine cassette 110 placed on the buffer station 760 to the refill cassette stage 720. At this time, the operation of moving the empty medicine cassette 110 stored in the medicine cassette storage part 500 to the buffer station 760 may be performed by the transfer robot 620 provided in the automatic medicine packing machine 100, the refill cassette transfer device (for example, the first refill cassette transfer device 730) provided in the medicine cassette refill system 700, or another additional transfer device, and the like.

As described above, when the medicine cassette 110 to be refilled is delivered to the refill cassette stage 720, the refill cassette stage 720 is moved to the refill station 740 along the rail system 710. Subsequently, when the refill cassette stage 720 is moved to the refill station 740, the second refill cassette transfer device 750 grips the empty medicine cassette 110 placed on the refill cassette stage 720 and delivers the same to the refill station 740. The empty medicine cassette 110 delivered to the refill station 740 may be filled with medicines by a pharmacist or manager working at the refill station 740.

When the medicine refill of the empty medicine cassette 110 is completed in the above manner and the medicine-filled cassette 110 is placed on the refill station 740, the medicine-filled cassette 110 may be supplied to each automatic medicine packing machine 100 in an order opposite the above order and may be stored in the medicine cassette storage part 500 of the automatic medicine packing machine 100.

For implementation of such an automation system, the refill cassette state 720, the refill station 740, the buffer station 760 and the like may include a mounting holder configured to hold the medicine cassette. The mounting holder may include the identification information storage part for identifying the position information and/or the interface unit for exchanging the identification information with the medicine cassette therethrough, like the medicine cassette mounting part 200, the medicine cassette storage part 500, the temporary stage 660, and the like described above.

With such a configuration, since the empty medicine cassette 110 located in the medicine cassette storage part 500 of the aforementioned automatic medicine packing machine 100 can be automatically replaced with the medicine-filled cassette 110, it is possible to more quickly and stably perform the operation of collecting and packing the medicines using the automatic medicine packing machine 100.

Although the present disclosure has been described above by way of particular matters such as specific components and the like, specific embodiments and the accompanying drawings, such descriptions are merely provided for the sake of easier understanding of the present disclosure. However, the present disclosure is not limited to the above embodiments, but various modifications and variations may be made by those skilled in the art.

A While the present disclosure has been described with reference to specific items such as particular components, exemplary embodiments, and drawings, these are merely provided to help understanding the present disclosure, and the present disclosure is not limited to these embodiments, and those skilled in the art to which the present disclosure pertains can variously alter and modify from the description of the present disclosure.

Therefore, the spirit of the present disclosure should not be limited to the above-described embodiments, and it should be construed that the appended claims as well as all equivalents or equivalent modifications of the appended claims will fall within the scope of the present disclosure.

DESCRIPTION OF REFERENCE NUMERALS

100: automatic medicine packing machine
110: medicine cassette
120: first grip groove
130: second grip groove
200: medicine cassette mounting part
210: mounting holder
220: through-hole
230: first row of medicine cassette mounting part
240: second row of medicine cassette mounting part
300: medicine collecting part
310: medicine collecting tray
320: conveyor belt
330: reception pocket
340: medicine collecting hopper
350: powdery-medicine supply part
360: powdery-medicine transfer part
400: medicine packing part
500: medicine cassette storage part
510: storage region
520: storage shelf
530: first row of medicine cassette storage part
540: second row of medicine cassette storage part
550: movement rail
560: space (formed between adjacent storage shelves)
600: medicine cassette replacement system
610: guide rail
620: transfer robot
630: joint (of the transfer robot)
640: gripper (of the transfer robot)
650: mounting base
660: temporary stage
700: medicine cassette refill system
710: rail system
720: refill cassette stage
730: first refill cassette transfer device
740: refill station
750: second refill cassette transfer device
760: buffer station

What is claimed is:

1. An automatic medicine packing machine for automatically packing medicines on a dose basis according to prescription information, comprising:

a medicine cassette mounting part in which a plurality of medicine cassettes for supplying the medicines are mounted;

a medicine collecting part configured to collect the medicines supplied according to the prescription information;

a medicine packing part configured to pack the medicines collected by the medicine collecting part on the dose basis;

a medicine cassette storage part in which a plurality of medicine cassettes are placed and stored; and a medicine cassette replacement system configured to grip the medicine cassette and replace the medicine cassette between the medicine cassette mounting part and the medicine cassette storage part, wherein the medicine cassette replacement system includes a transfer robot equipped with a gripper for gripping the medicine cassette at an end portion of the transfer robot, the medicine cassette replacement system is configured such that the transfer robot is movable relative to the medicine cassette mounting part and the medicine cassette storage part along a guide rail, the medicine collecting part is disposed below the medicine cassette mounting part, and includes a medicine collecting tray that receives medicines discharged from the medicine cassette, the medicine collecting tray includes a plurality of medicine collecting pockets, wherein each of the medicine collecting pockets moves relative to the medicine cassette mounting part below the medicine cassette mounting part through a conveyor belt rotated by an electric motor, and receives the medicines from the medicine cassette mounted on the medicine cassette mounting part, each of the medicine collecting pockets receives the medicines supplied according to the prescription information from the medicine cassette mounted on the medicine cassette mounting part while moving according to a rotation of the conveyor belt, and then forwards medicines of one dose to a medicine collecting hopper disposed below one end portion of the medicine collecting tray while moving according to the rotation of the conveyor belt, wherein the transfer robot is formed as a multi-joint robot, and wherein the medicine cassette has a first grip groove formed to extend from a top of the medicine cassette toward a bottom of the medicine cassette in a vertical direction, and the gripper of the transfer robot is inserted to the first grip groove such that the medicine cassette is transferred while the medicine cassette is gripped by the transfer robot.

2. The automatic medicine packing machine of claim 1, wherein the medicine cassette replacement system includes a temporary stage provided at one side of the transfer robot and on which the medicine cassette is placed.

3. The automatic medicine packing machine of claim 2, wherein the medicine cassette is arranged in a same upward-downward orientation on the medicine cassette mounting part, the medicine cassette storage part and the temporary stage.

4. The automatic medicine packing machine of claim 3, wherein the transfer robot is configured to transfer the medicine cassette while keeping the upward-downward orientation of the medicine cassette constant.

5. The automatic medicine packing machine of claim 4, wherein the medicine cassette has a second grip groove formed to extend along a lateral direction.

6. The automatic medicine packing machine of claim 5, wherein:

the medicine cassette is provided with an identification information storage part that stores identification information on at least one of a type and quantity of the medicines stored in the medicine cassette, portions at which the medicine cassette is mounted in the medicine cassette mounting part, the medicine cassette storage part and the temporary stage are provided with an identification information storage part that stores position information of the medicine cassette, and the medicine cassette, the medicine cassette mounting part, the medicine cassette storage part and the temporary stage include an interface unit configured to transmit and receive the identification information stored in the identification information storage part.

7. The automatic medicine packing machine of claim 6, wherein:

the medicine cassette storage part is formed as storage shelves of a multi-layered structure in which a plurality of storage regions are formed, and the medicine cassettes are able to be arranged in the plurality of storage regions in plural rows and plural columns.

8. The automatic medicine packing machine of claim 7, wherein:

all or a portion of the medicine cassette storage part is formed to have a configuration in which a plurality of storage shelves are arranged in the plural rows, and the plurality of storage shelves are arranged in one direction in each of the plural rows.

9. The automatic medicine packing machine of claim 8, wherein:

at least storage shelves other than rearmost storage shelve among the plurality of storage shelves arranged in the plural rows are configured to move along a movement rail, and an empty space is formed between adjacent storage shelves among the storage shelves other than the rearmost storage shelves.

10. The automatic medicine packing machine of claim 6, wherein the medicine collecting part and the medicine packing part include a plurality of medicine collecting parts and a plurality of medicine packing parts, respectively.

11. A factory-type automatic medicine packing system including a plurality of the automatic medicine packing machine of claim 1, comprising:

a rail system provided at one side of the automatic medicine packing machine;

a refill cassette stage mounted on the rail system and configured to be able to move along the rail system;

a first refill cassette transfer device configured to transfer a medicine cassette between the automatic medicine packing machine and the refill cassette stage;

a refill station configured to fill medicines in the medicine cassette; and a second refill cassette transfer device configured to transfer the medicine cassette between the refill cassette stage and the refill station.

* * * * *